Feb. 7, 1933.  E. B. BENNETT  1,896,997
COMPASS COURSE FINDER
Filed Dec. 6, 1929  3 Sheets-Sheet 1

Edwin B. Bennett
INVENTOR
BY Victor J. Evans
ATTORNEY

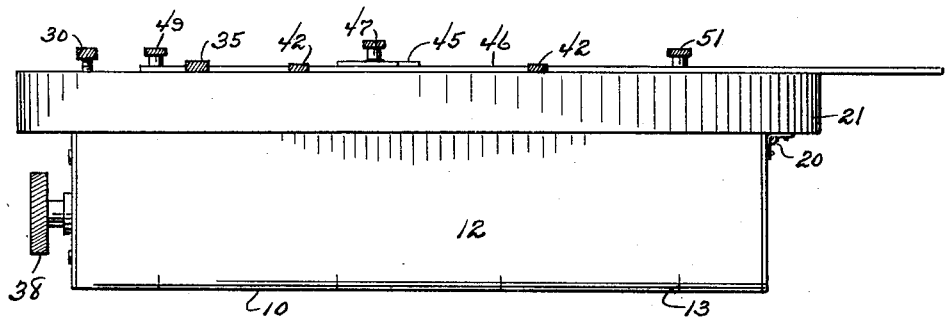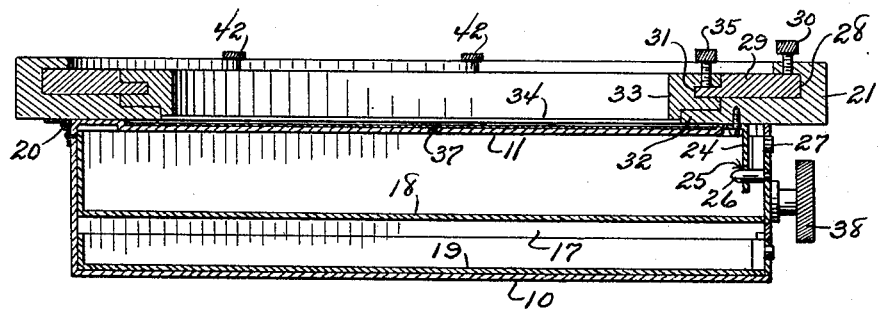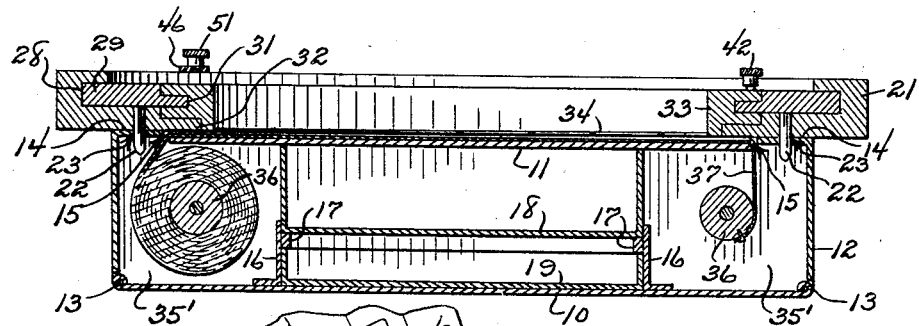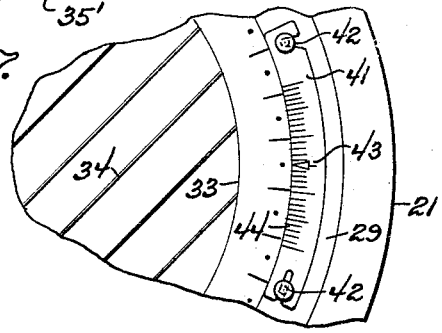

Feb. 7, 1933.  E. B. BENNETT  1,896,997
COMPASS COURSE FINDER
Filed Dec. 6, 1929   3 Sheets-Sheet 3

Edwin B. Bennett
INVENTOR

BY Victor J. Evans
ATTORNEY

Patented Feb. 7, 1933

1,896,997

UNITED STATES PATENT OFFICE

EDWIN B. BENNETT, OF AVALON, NEW JERSEY

COMPASS COURSE FINDER

Application filed December 6, 1929. Serial No. 412,205.

This invention relates to course finders or indicators for use in connection with a compass, an object being to provide a device which may be set in accordance with the proposed trip to indicate the compass course to be followed, so that the pilot or navigator may, at a glance, read the proper course to be followed and determine whether or not he is off his course, the invention being especially adapted for the use of air pilots, although it may be used by mariners and others.

Another object of the invention is the provision of a device of the above character which may be set at the beginning of a trip to indicate the proper compass course to be followed and may be reset during the progress of the trip should the pilot or navigator, for any reason, leave his true course.

Another object of the invention is the provision of a course finder or indicator by means of which the position of a ship or vessel may be temporarily indicated upon a chart, and the indicator conveniently changed with the change of position of the ship or vessel.

Another object of the invention is the provision of means for indicating the course in accordance with the wind drift of an airship, means being provided for setting the compass course in accordance with the wind velocity and speed of travel of the ship.

With the above and other objects in view, the invention further includes the following novel features and details of construction, to be hereinafter more fully described, illustrated in the accompanying drawings and pointed out in the appended claims.

In the drawings:—

Figure 3 is a side view.

Figure 4 is a sectional view taken substantially on the line 4—4 of Figure 1.

Figure 5 is a like view on the line 5—5 of Figure 1.

Figure 7 is a fragmentary plan view illustrating the wind drift attachment.

Figure 1:
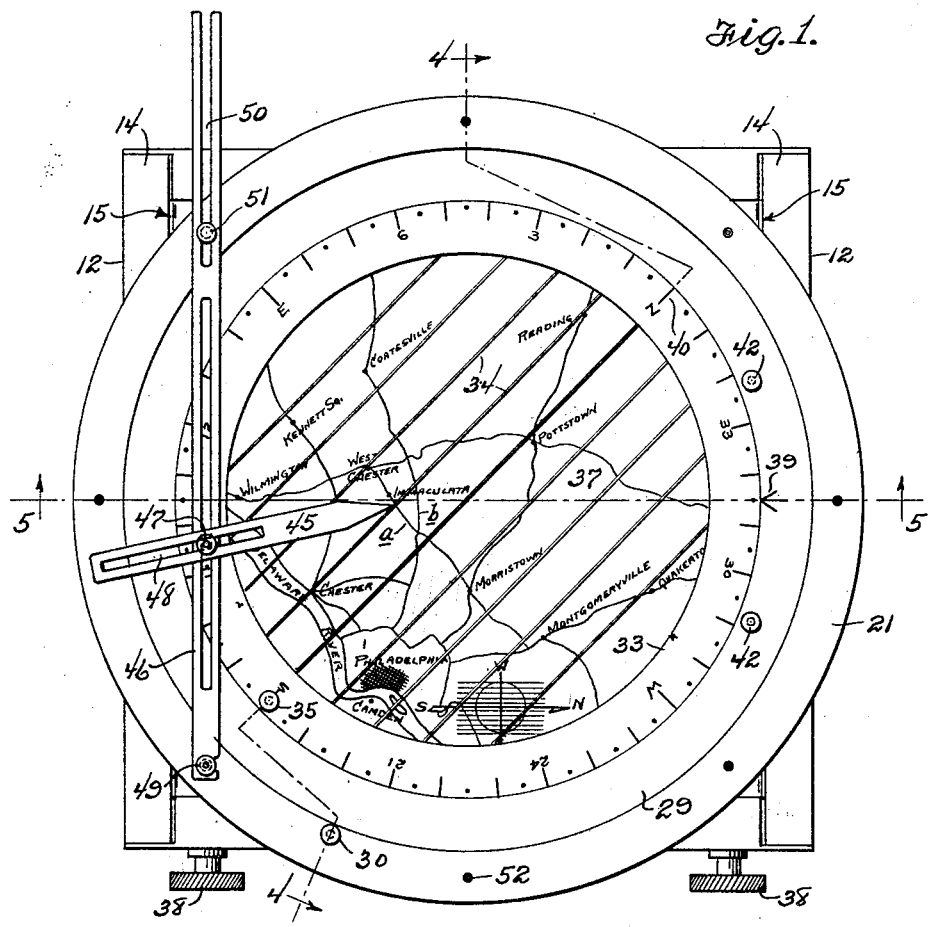
Figure 1 is a plan view of the invention with the finder arranged for use.
Figure 2:
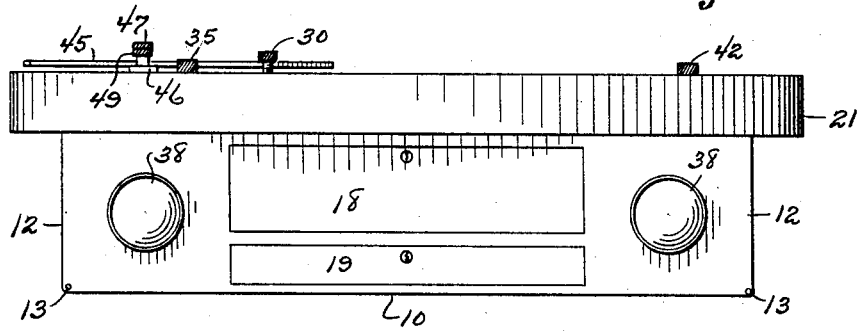
Figure 2 is a front view of the same.
Figure 6:
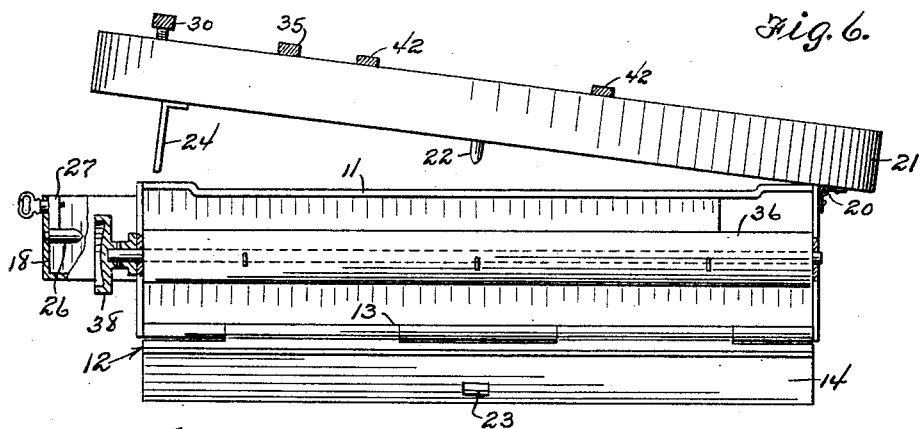
Figure 6 is a side elevation with the cover frame raised and one of the drawers partly extended, parts being broken away and shown in section.

Referring to the drawings in detail wherein like characters of reference denote corresponding parts, the invention as shown comprises a casing which includes a bottom 10, a stationary top 11 and sides 12, the latter being hingedly attached to the bottom as shown at 13. The sides 12 have extending inwardly from their upper edges, flanges 14 whose inner edges are spaced from the adjacent edges of the top 11 so as to provide parallel slots 15 in the top of the casing. Extending within the casing parallel with the sides 12 are upstanding partitions 16, and these partitions together with rails 17 provide drawer guides 18 and 19, which are designed to accommodate attachments for the finder and for other articles.

Hingedly secured to the casing as shown at 20 is a cover frame 21 which is preferably circular. This cover frame has extending downwardly therefrom pins 22 which are receivable within openings 23 provided in the flanges 14 of the sides of the casing.

By reference to Figure 5 of the drawings it will be seen that when the frame 21 is down upon the casing, the pins 22 will engage the flanges 14 and prevent outward swinging movement of the sides 12.

Also extending downwardly from the frame 21 is a tongue 24. This tongue is provided with an opening 25 for the reception of a pin 26 which extends inwardly from the face of the drawer 18, and when this pin is engaged within the opening 25 the frame 21 will be held against upward swinging movement, so that the sides 12 of the casing will be held in closed position. A lock 27 on the drawer 18 prevents opening of the drawer and consequent raising of the frame 21.

The frame 21 is cross sectionally shaped to provide a groove 28 which receives an outer rotatable ring 29. This ring may be held against rotation by means of a set screw 30 which extends through the frame 21 for binding action upon the ring.

The ring 29 is provided with an inwardly extending annular rib 31, and this rib together with a rib 32 formed upon the frame 21, provide guiding means for an inner rotatable ring 33. This inner ring carries spaced parallel wires 34. In addition, the inner ring carries a set screw 35 which is adapted to bear upon the tongue 31 to lock the rings 29 and 33 together.

Rotatably mounted within compartments 35' formed in the casing between the sides 12 and the sides of the drawer 18 are rolls 36. These rolls are adapted to have detachably secured thereto the opposite ends of a chart strip 37, so that the strip may be unwound from one roll and wound upon the other. For this purpose, the rolls 26 have attached thereto operating knobs 38.

By reference to Figure 5 of the drawings it will be seen that the chart strip 37 extends across the permanent top 11 of the casing and downwardly through the slots 15 into the compartments 35' and is wound upon the rolls 36 through the medium of the knobs 38. Thus any desired section of the chart may be brought into view within the ring 33 and beneath the wires 34.

The ring 29 is provided with a mark or zero indicator 39, and the ring 33 is provided with spaced marks 40 and indicia representing the points of the compass.

In the use of the invention assuming that a trip is to be made from Chester to Reading as indicated on the chart in Figure 1 of the drawings. The chart is operated until the compass sign indicating north is brought into view. The ring 33 is then rotated until north upon this ring registers with the indicator 39 on the ring 29. The rings 29 and 33 are then locked together through the screw 35 and the screw 30 is operated to release the ring 29.

Both rings are then rotated until the wires 34 are parallel with north on the chart. The ring 29 is then locked to the frame 21 and remains stationary with this frame, the indicator 39 on the ring 29 then being directly north with respect to the chart. The ring 33 is then rotated independently until one of the wires 34 provides a direct line between Chester and Reading. The ring 33 is then locked in position by means of the screw 35. The compass course between Chester and Reading will then be indicated. In the event that none of the wires cut directly through the points desired, rotate the chart roller knob 38 until one of the wires 34 and the two points upon the chart line up.

Should the flyer have any reason to get off his course, the position of the ring 33 may be changed so that one of the wires 34 will indicate a new course. For example, should the original course be from Chester to Reading and the flyer for any reason find himself at West Chester, the ring 33 may be moved so that one of the wires 34 will indicate a course from West Chester to Reading and a new and proper compass course will be indicated.

While the points of the compass are indicated upon the section of the chart shown, it is obvious that these points may be at any position or upon any section of the chart and the rings 29 and 33 set for north by these points.

The chart may then be adjusted to bring the desired section into view and the ring 33 arranged so that one of the wires 34 will indicate the desired course between two points.

Various charts may be substituted by swinging the frame 21 upward after it has been released and swinging the sides 12 of the casing downward. The ends of the chart 37 may be then detached from the rolls 36 and a new chart attached.

In order to provide for wind drift, an arcuate plate is detachably secured to the ring 29 by means of screws 42. This plate carries an indicator 43 and is provided with graduations 44 upon opposite sides of the indicator. The indicator 43 will represent the indicator 39 previously described, while the graduations 44 represent mile scale upon the opposite sides of the indicator 43. Assuming that the airship is travelling ninety miles per hour, 315 degree course, which is the course from Chester to Reading, Figure 1, with the wind northeast or 45 degrees at 20 miles per hour. Without changing the position of ring 33, the air course would be obtained allowing for wind drift on ring 33 opposite 10 miles per hour mark on arcuate plate 41, which would give you a course of 321 degrees. The reason for reading on the 10 miles per hour mark of the arcuate plate instead of the 20 miles per hour mark is that it is only a 45 mile course or one-half hour flight, as the speed of the airship is 90 miles per hour. If the length of the flight was 90 miles, or one hour, the reading would be opposite the 20 mile mark on the plate 41.

The invention further provides a position locator in the form of a location pointer 45. This pointer is slidingly and pivotally mounted upon a bar 46. For this purpose, the bar 46 carries a set screw 47 which operates within an elongated slot 48 formed in the pointer 45.

The bar 46 is provided at one end with a notch for the reception of a set screw 49, and at its opposite end with a slot 50 for the reception of a set screw 51. The set screws 50 and 51 are carried by the frame 21 and this frame is provided with spaced openings 52 so that the position of these screws 49 and 51 may be changed. By this means, the position of the bar 46 may be changed with respect to the chart, so that the indicator 45 may be placed to indicate any desired position upon the chart.

Assuming that the course is from Chester to Reading, the pilot may place his pointer 45 to indicate points passed. For example, after he has passed the road *a* from West Chester to Morristown, he places the pointer in the position shown in Figure 1 of the drawings. After passing the road *b* leading from Coatesville to Philadelphia, he changes the position of his pointer to indicate this road. He then knows that both of these roads have been passed. This location pointer is especially useful in travelling over territory not plainly marked.

Figure 8:
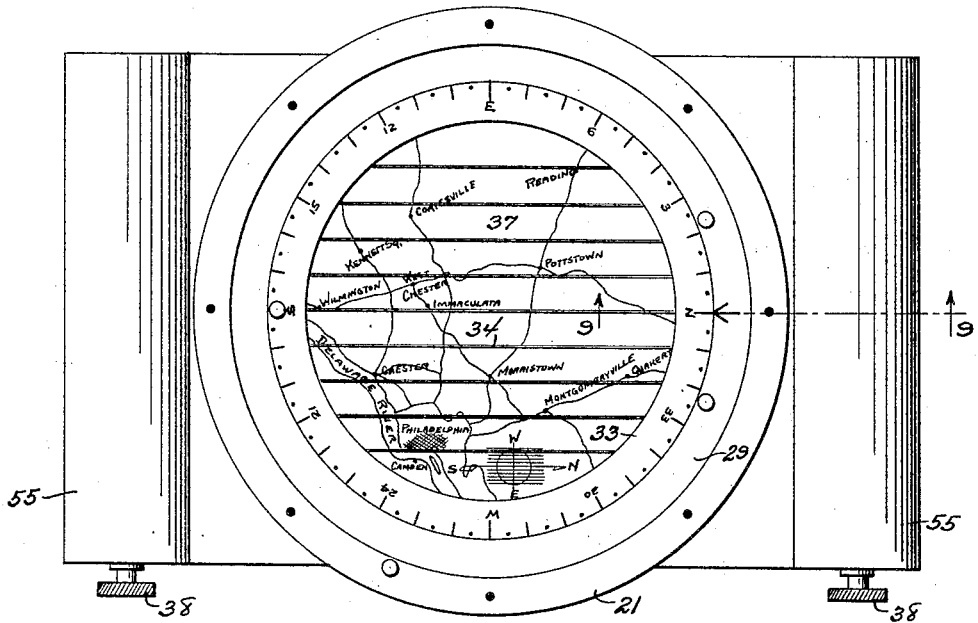
Figure 8 is a plan view showing a slightly different form of the invention.
Figure 9:
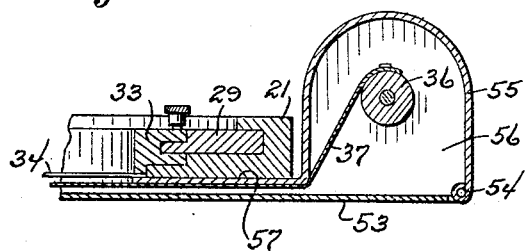
Figure 9 is a detail section on the line 9—9 of Figure 8.

In Figures 8 and 9 of the drawings there is shown a slightly different form of the invention wherein the casing has hingedly secured to the base or bottom 53, as indicated at 54, members 55. These members form compartments 56 for the rolls 36 upon which the strip chart 37 is wound. The frame 21 rests upon the inner portions 57 of the members 55. In other respects, the construction is the same as that previously described.

In Figure 8 of the drawings, the rings 29 and 33 are arranged so that the wires 34 indicate north, this being the position of the parts previous to the adjustment of the ring 33 to bring one of the wires 34 into position to indicate the compass course.

By reference to the drawings it will be seen that the points of the compass are arranged in reverse order from their usual arrangement, in order to obtain a correct reading.

The invention is susceptible of various changes in its form, proportions and minor details of construction and the right is herein reserved to make such changes as properly fall within the scope of the appended claims.

Having described the invention what is claimed is:—

1. In a compass course finder, a pair of concentrically arranged rotatable rings, a chart positioned beneath the rings, spaced parallel transverse wires arranged within the inner ring, said inner ring having the points of the compass thereon, an indicator mark upon the outer ring, means to lock one or both of the rings against rotation, or to lock said rings together for rotation as a unit, and a wind drift scale carried by the outer rotatable ring.

2. In a compass course finder, a casing including a fixed top and oppositely arranged hinged sides having inwardly extending top flanges, with the edges of said flanges spaced from the adjacent edges of the fixed top to define parallel slots, rolls mounted for rotation within the casing, a strip chart extending across the fixed top through the slots and adapted to be wound upon and unwound from the rolls, course finding apparatus hinged to one edge of the casing above and cooperating with the chart, interlocking elements between the flanges of the hinged sides and course finding apparatus to lock the sides against movement when said apparatus is in position for use, and means to lock the course finding apparatus against movement relative to the casing.

3. In a compass course finder, a pair of inner and outer rings, one concentric within the other and being interconnected and rotatable independently or together, a supporting casing for the outer ring, means for locking the inner and outer ring together, whereby they may move as a unit, means for locking the outer ring against rotation and relative to the supporting casing, when the inner and outer rings are either locked together, or the inner ring is unlocked and movable independently of the outer ring, a chart carried by the supporting casing and positioned immediately beneath the inner ring, spaced parallel wires arranged within the inner ring, said inner ring provided thereon with points of a compass, said outer ring provided thereon with an indicator mark, and relative to which the compass points may be adjusted according to the position of both rings, and a wind drift scale carried by the outer ring.

In testimony whereof I affix my signature.

EDWIN B. BENNETT.